United States Patent
Sinha et al.

(10) Patent No.: US 9,525,848 B2
(45) Date of Patent: Dec. 20, 2016

(54) DOMAIN TRUSTED VIDEO NETWORK

(71) Applicant: Highfive Technologies, Inc., Redwood City, CA (US)

(72) Inventors: Shantanu Sinha, Palo Alto, CA (US); Jeremy Roy, Woodside, CA (US); Ohene Kwasi Ohene-Adu, Santa Clara, CA (US); Edward Wei, Palo Alto, CA (US)

(73) Assignee: Highfive Technologies, Inc., Redwood City, CA (US)

( * ) Notice: Subject to any disclaimer, the term of this patent is extended or adjusted under 35 U.S.C. 154(b) by 0 days.

(21) Appl. No.: 14/726,184

(22) Filed: May 29, 2015

(65) Prior Publication Data
US 2015/0350601 A1 Dec. 3, 2015

Related U.S. Application Data

(60) Provisional application No. 62/005,575, filed on May 30, 2014.

(51) Int. Cl.
| | | |
|---|---|---|
| *H04N 7/14* | (2006.01) | |
| *H04N 7/15* | (2006.01) | |
| *H04L 12/18* | (2006.01) | |
| *H04W 12/06* | (2009.01) | |

(Continued)

(52) U.S. Cl.
CPC ............ *H04N 7/15* (2013.01); *H04L 12/1818* (2013.01); *H04L 63/08* (2013.01); *H04W 12/06* (2013.01); *H04L 47/20* (2013.01)

(58) Field of Classification Search
USPC .......................................... 348/14.01–14.09
See application file for complete search history.

(56) References Cited

U.S. PATENT DOCUMENTS

| | | |
|---|---|---|
| 6,356,309 B1 | 3/2002 | Masaki et al. |
| 6,735,202 B1 | 5/2004 | Ahmed et al. |
| 6,915,331 B2 | 7/2005 | Fuller et al. |

(Continued)

FOREIGN PATENT DOCUMENTS

| | | |
|---|---|---|
| EP | 967769 B1 | 8/2006 |
| JP | 2007325248 A | 2/2005 |

(Continued)

OTHER PUBLICATIONS

International Search Report and Written Opinion, Application No. PCT/US2015/033413, Aug. 27, 2015, 15 pages.

(Continued)

*Primary Examiner* — Maria El-Zoobi
(74) *Attorney, Agent, or Firm* — Nicholson De Vos Webster & Elliott, LLP

(57) ABSTRACT

A dynamic video communications system provides real time provisioning of a video communication session in a domain video network between a set of user devices. The real time provisioning is implemented by receiving an identifier of a video communication session from a user device, where the identifier includes a domain and a name, determining an authentication principle associated with the user device, where the authentication principle includes a domain of the user, checking whether the domain of the user matches a domain of the video communication session, and joining the user device with the video communication session.

18 Claims, 4 Drawing Sheets

CALL CREATION PROCESS

(51) Int. Cl.
*H04L 29/06* (2006.01)
*H04L 12/813* (2013.01)

(56) References Cited

U.S. PATENT DOCUMENTS

| | | | |
|---|---|---|---|
| 6,977,929 B1 | 12/2005 | Caronni et al. | |
| 7,184,418 B1 | 2/2007 | Baba et al. | |
| 7,296,091 B1 | 11/2007 | Dutta et al. | |
| 7,353,255 B2 | 4/2008 | Acharya et al. | |
| 8,204,206 B2 | 6/2012 | Townsend et al. | |
| 8,230,079 B2 | 7/2012 | Rosenberg et al. | |
| 8,407,288 B2 | 3/2013 | Thapa | |
| 8,584,211 B1* | 11/2013 | Vetter | H04L 63/105 707/786 |
| 8,634,420 B2 | 1/2014 | Rao et al. | |
| 9,215,413 B2 | 12/2015 | Bright-Thomas | |
| 2002/0150094 A1 | 10/2002 | Cheng et al. | |
| 2004/0122976 A1 | 6/2004 | Dutta et al. | |
| 2005/0076128 A1 | 4/2005 | Tsai | |
| 2005/0084114 A1 | 4/2005 | Jung et al. | |
| 2007/0112811 A1 | 5/2007 | Shen et al. | |
| 2007/0263078 A1 | 11/2007 | Shah et al. | |
| 2007/0294263 A1 | 12/2007 | Punj et al. | |
| 2009/0245240 A1* | 10/2009 | Mao | H04L 45/00 370/352 |
| 2010/0125895 A1* | 5/2010 | Shull | H04L 63/08 709/206 |
| 2010/0153574 A1* | 6/2010 | Lee | H04L 12/1827 709/231 |
| 2010/0228824 A1 | 9/2010 | Lin et al. | |
| 2010/0319062 A1* | 12/2010 | Danieli | H04L 12/1818 709/205 |
| 2011/0055249 A1 | 3/2011 | Consuegra et al. | |
| 2011/0107379 A1 | 5/2011 | LaJoie et al. | |
| 2011/0141218 A1 | 6/2011 | Stancato | |
| 2011/0213974 A1* | 9/2011 | Ardon | H04L 12/58 713/169 |
| 2011/0270933 A1 | 11/2011 | Jones et al. | |
| 2012/0171996 A1* | 7/2012 | Mocanu | H04W 12/06 455/411 |
| 2013/0081118 A1* | 3/2013 | Ge | H04L 63/0815 726/6 |
| 2013/0263216 A1 | 10/2013 | Vakil et al. | |
| 2013/0318249 A1 | 11/2013 | McDonough et al. | |
| 2014/0004839 A1 | 1/2014 | Block et al. | |
| 2014/0019549 A1 | 1/2014 | Wei | |
| 2014/0022889 A1 | 1/2014 | Syrett et al. | |
| 2014/0025777 A1 | 1/2014 | Spencer | |
| 2015/0089568 A1* | 3/2015 | Sprague | H04L 63/0876 726/1 |
| 2015/0128274 A1* | 5/2015 | Giokas | H04L 63/1425 726/23 |
| 2015/0349971 A1 | 12/2015 | Sinha et al. | |
| 2015/0350604 A1 | 12/2015 | Roy et al. | |

FOREIGN PATENT DOCUMENTS

| | | |
|---|---|---|
| JP | 2005039515 A | 12/2007 |
| JP | 2012015808 A | 1/2012 |
| KR | 102014005822 A1 | 5/2014 |

OTHER PUBLICATIONS

International Search Report and Written Opinion, Application No. PCT/US2015/033414, Aug. 27, 2015, 11 pages.
International Search Report and Written Opinion, Application No. PCT/US2015/033414, Sep. 7, 2015, 13 pages.
"Build a Mobility Proxy," Columbia University, Research Project, <http://www.cs.columbia.edu/~hgs/research/projects/sip_mobility/report.pdf> downloaded from the internet on Feb. 11, 2014, 17 pages.
"Cisco TelePresence Multipoint Switch; Collaborate Between Multiple Locations," Cisco <http://www.cisco.com/c/en/us/products/conferencing/telepresence-multipoint-switch/index.html>, downloaded from the internet on Feb. 11, 2014, 3 pages.
"Networking best practices for large deployments," Google, Inc. <http://static.googleusercontent.com/external_content/untrusted_dlcp/www.google.com/en//support/enterprise/static/gapps/docs/admin/en/nftf/networking_guide/gapps_networking_guide.pdf>, (Oct. 15, 2013), 42 pages.
Banerjee, et al., "Hand-off delay analysis in SIP-based mobility management in wireless networks," IEEE 2003, A32, (Apr. 22-26, 2003), 8 pages.
Non-Final Office Action, U.S. Appl. No. 14/726,307, mailed Mar. 30, 2016, 16 pages.

* cited by examiner

CALL CREATION PROCESS

GENERAL ARCHITECTURE

DOMAIN TRUSTED VIDEO NETWORK

CROSS-REFERENCE TO RELATED APPLICATIONS

This application claims priority to U.S. Provisional Patent Application No. 62/005,575 filed on May 30, 2014. This application is related to co-pending U.S. patent application Ser. No. 14/726,271, entitled "PROXIMITY-BASED CONFERENCE SESSION TRANSFER," and co-pending U.S. patent application Ser. No. 14/726,307, entitled "METHOD AND SYSTEM FOR MULTIPARTY VIDEO CONFERENCING," both filed herewith, which are incorporated herein by reference.

FIELD OF THE INVENTION

The embodiments of the invention relate to a method and apparatus for improving video teleconferencing. Specifically, the embodiments of the invention relate to a method for enabling provisionless video communication session creation and improved ease of use for participants to join a video communication session.

BACKGROUND

Video teleconferencing is utilized to enable collaboration and meetings to take place between participants in locations remote from one another. A video communication session is created by one of the participants through a provisioning process whereby a user interacts with a video communication system to reserve a set of resources in advance of a scheduled meeting time. The video communication system generates an advertisement or similar message that is sent to the participants to enable them to connect with the video communication system at the scheduled time. This message includes instructions on connecting to the video communication system and provides a video communication session identifier and a video communication session password. Without this provisioning process the participants cannot utilize the video communication system to communicate with one another.

The participants utilize a personal computer or mobile device that executes a specialized client application that connects to the video communication system when connecting to the provisioned video communication session. The video communication system restricts access to the provisioned video communication session to a set of users provided by the user that set up the video teleconference. Only those participants specified at the time of provisioning can connect to the video communication session. The users must provide the video communication session identifier generated by the video communication system along with the password to enable connection to the video communication session.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
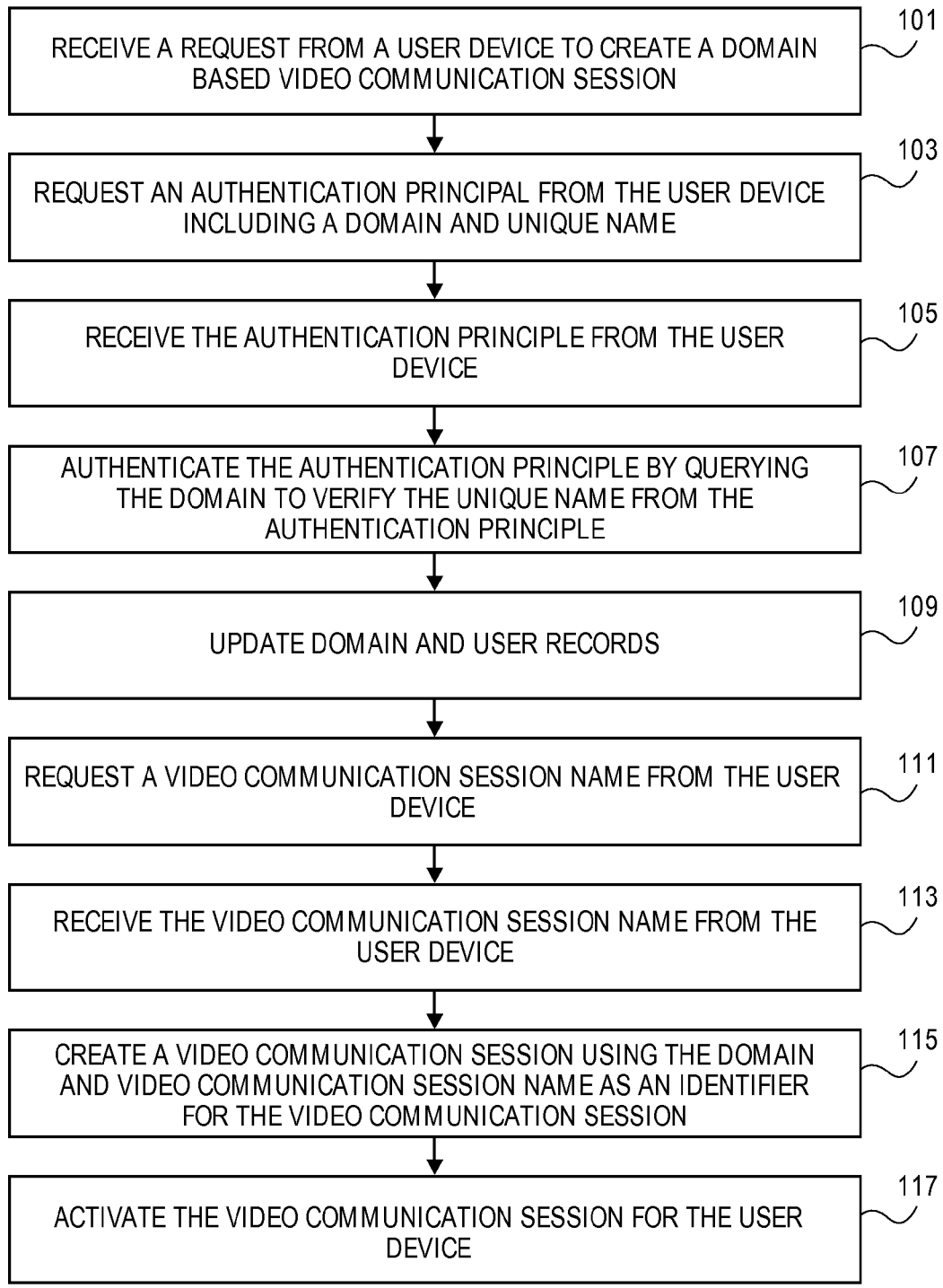
FIG. 1 is a flowchart of one embodiment of a process for creation of a video communication session.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiment of the figures. However, it should be understood that the operations of the flow diagrams can be performed by embodiments of the invention other than those discussed with reference to the figures, and the embodiments discussed with reference to the figures can perform operations different than those discussed with reference to the flow diagrams of the figures. Some of the figures provide example topologies and scenarios that illustrate the implementation of the principles and structures of the other figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). As used herein, a network is a set of interconnected devices that are capable of communicating data that enables the transfer of data between any two network elements in the network. The network can include links that are wired or wireless mediums for communication and can include any number of devices that communicate with any combination of networking protocols and technologies.

Overview

The embodiments of the present invention provide a system, network and method for a provisionless domain-trusted video communication system for a set of domain-based groups. A 'provisionless' video communication system enables the creation and destruction of video communication sessions by users in real-time, where a user can create a rendezvous point accessible via a uniform resource locator (URL) or similar address referred to herein as a 'video communication session identifier' that s partially or wholly selected by the user. Any other user that is provided this video communication session identifier can instantly join the video communication session. There is no need for a reservation system or pre-allocation of a video communication session identifier.

The video communication session identifier is bound to a domain creating a domain based security model where members of the domain are trusted to connect to any video communication session tied to the domain. A domain-trusted video communication indicates that the video communication sessions are open to all users that are established to be a member of a domain and that these users that are members of the domain are subject to the same set of policies. Users that are not members of a domain can join video communication sessions associated with the domain, but may be subject to separate policies or authentication protocols before being allowed to join the video communication session.

The video communication system can be hosted by a set of video communication management servers that support the creation of the video communication sessions and the joining process. The video communication management servers can also facilitate the authentication of users to their domains. The video communication management servers can communicate with an authentication service provided by a domain to authenticate users or similarly utilize external authentication services to verify that users are members in good standing with their respective domains. In this manner, the video communication system provides for a self-organizing virtual domain based video network.

FIG. 1 is a flowchart of one embodiment of a process for creation of a video communication session. In one embodiment, the process for creation of a video communication session begins with a receipt of a request from a user via a user device to create a domain based video communication session (Block 101). The user can generate a request from a specialized client application executed by the user device, via a general purpose client application such as a web browser interacting with an interface server (e.g., web hosting server) of the video communication system. In some embodiments, the initial request includes an authentication principle and/or a video communication session name to authenticate a user to a domain and to generate a video communication session identifier, respectively. In other embodiments, this data is obtained in separate steps or requested of the user via interaction with the user via an interface provided by the client application in communication with the interface server.

The authentication principle can be requested from the user via the user device and interface server interaction (Block 103). The authentication principle can include a domain and a unique name. The domain can be specified or identified by a URL, an email address domain or similar domain identifier provided by the user. Similarly, a unique name can be provided by the user in the form of a username, email address or similar unique identifier of the user with regard to the associated domain.

Upon receipt of the authentication principal from the user (Block 105) via the user device client application and the interface server, the authentication manager can communicate with an authentication server of an identified domain, supplying the unique name and requesting authentication of the unique name (Block 107). This process can require additional interaction with the user via the client application and interface server if the authentication server of the domain requires a password or similar data from the user to complete the authentication of the user. Once authentication has completed to verify the user, the authentication manager can update a set of domain and user records maintained in a database of the video communication system.

The domain records can include information about the location of the authentication manager of each domain, metadata related to the user records and similar information (Block 109). Each user record can include the unique user name of a user for a given domain, video session metadata including history and logs of video sessions of the user, a reference to the associated domain record and similar information. When a user creates a first video communication session the registration manager can manage the creation of a user record for the new user. If the user is the first user from a given domain, then the registration manager can also create a domain record for the domain. Where a new user is encountered for an existing domain then a new domain record is not required. Where an existing user and domain are encountered, then the existing records can be updated with any tracked metadata or similar data related to the user or domain.

A video communication session name can be requested from the user via the client application of the user device and the interface server (Block 111). The user can supply any video communication session name (Block 113), there is no requirement that the name be unique within the video communication system or the associated domain. The provided video communication session name is combined with the domain to generate a video communication session identifier that can be provided to the user via the client application of the user device and the interface server. A video communication session is created and associated with the video communication session identifier by the video session manager (Block 115). The video communication session is immediately active (i.e., the video communication session is created in real-time) (Block 117). Anyone subsequently providing the video communication session identifier to the video session manager is joined with the existing video communication session.

Figure 2:
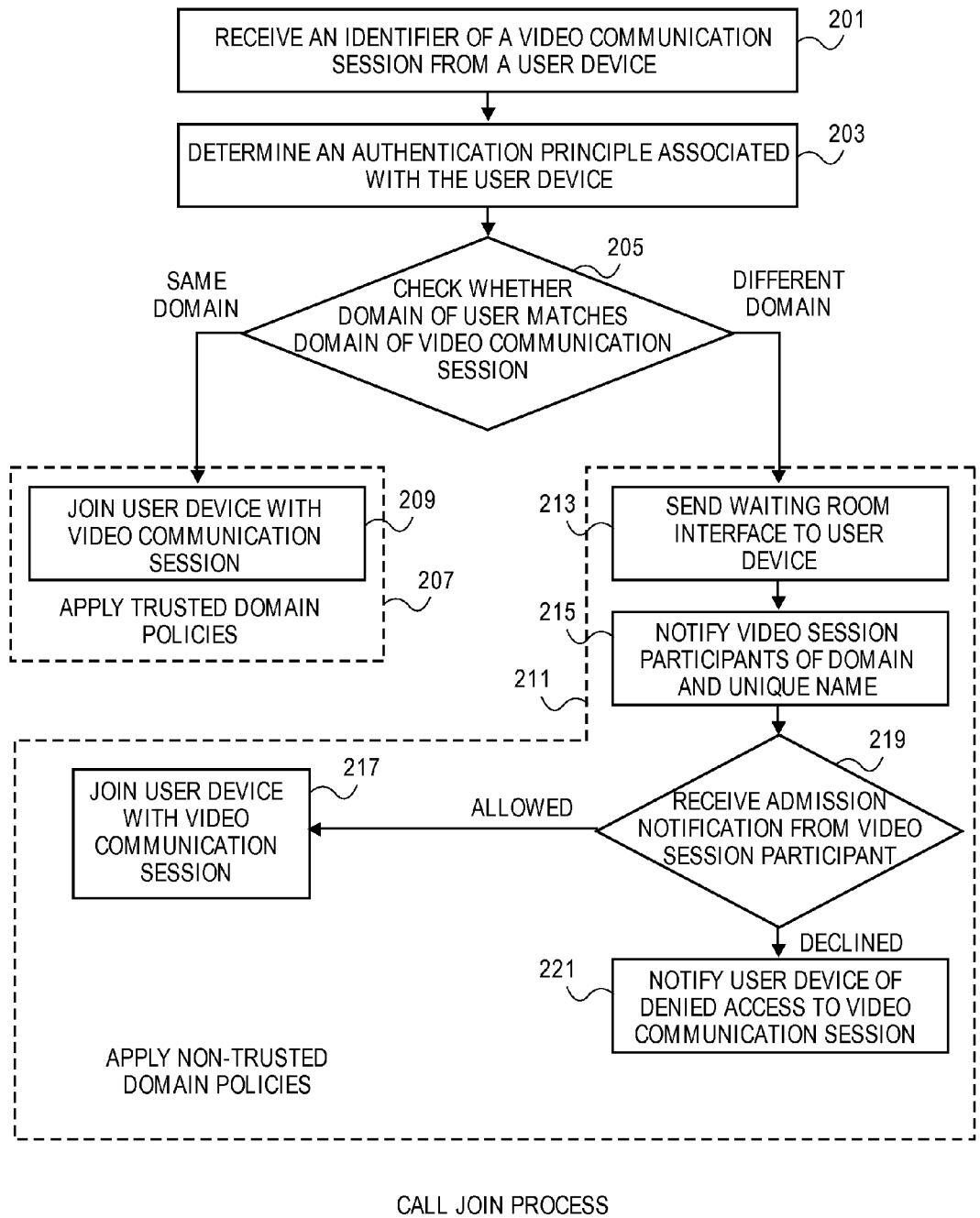
FIG. 2 is a flowchart of one embodiment of a process for joining the video communication session.

FIG. 2 is a flowchart of one embodiment of a process for joining the video communication session. Those users that provide a video communication session identifier to the video communication system after a video communication session is associated with the identifier initiate the video communication session join process. The video communication system can receive the video communication session identifier via a client application of any user device in communication with the video communication system (Block 201). Upon receipt of the video communication session identifier, the video communication system attempts to determine an authentication principle for the user via the client application of the user device. This information can be supplied with the initial video communication session identifier or can be obtained through interaction of the interface server and the client application of the user device.

Determining the authentication principle can include identifying the domain of the user. Determining the authentication principle can also include identifying a unique name of the user for a given domain, password information or similar information relevant to authentication of the user with the domain authentication server. This information can be obtained directly from the user via the client application, from existing user records or via similar processes. In some instances, authentication of a user to a domain requires querying an authentication server of the domain.

A check is made to determine whether the domain of the user matches a domain of the video communication session that is identified (Block 205). Where the user domain does match the domain of the video communication session, trusted domain policies can be applied (Block 207). The client application of the user is then immediately joined to the video communication session (Block 217). Where the user domain does not match the domain of the video communication session, non-trusted domain policies are applied (Block 211). These policies can require additional authentication, approval from a user from the trusted domain or similar policies can be applied.

In one example embodiment, the client application of the user device is sent to a waiting room interface (Block 213). A waiting room interface indicates that the user must wait for approval before being joined to a video communication session. A notification is sent to each of the current participants in the video communication session or to those that are members of the domain providing the domain and/or unique name of the user attempting to join the video communication session (Block 215). In response, the current participants can decide to allow or decline the join request, which is then provided to the user device in the form of an admission notification by the video session manager (Block 219).

If the admission notification indicates allowed access, then the client application of the user device is joined with the video communication session, although the participation is still governed by non-trusted domain policies (Block 217). If the admission notification indicates denied access, then the client application of the user device is notified and removed from the waiting room for the video communication session (Block 221).

Figure 3:
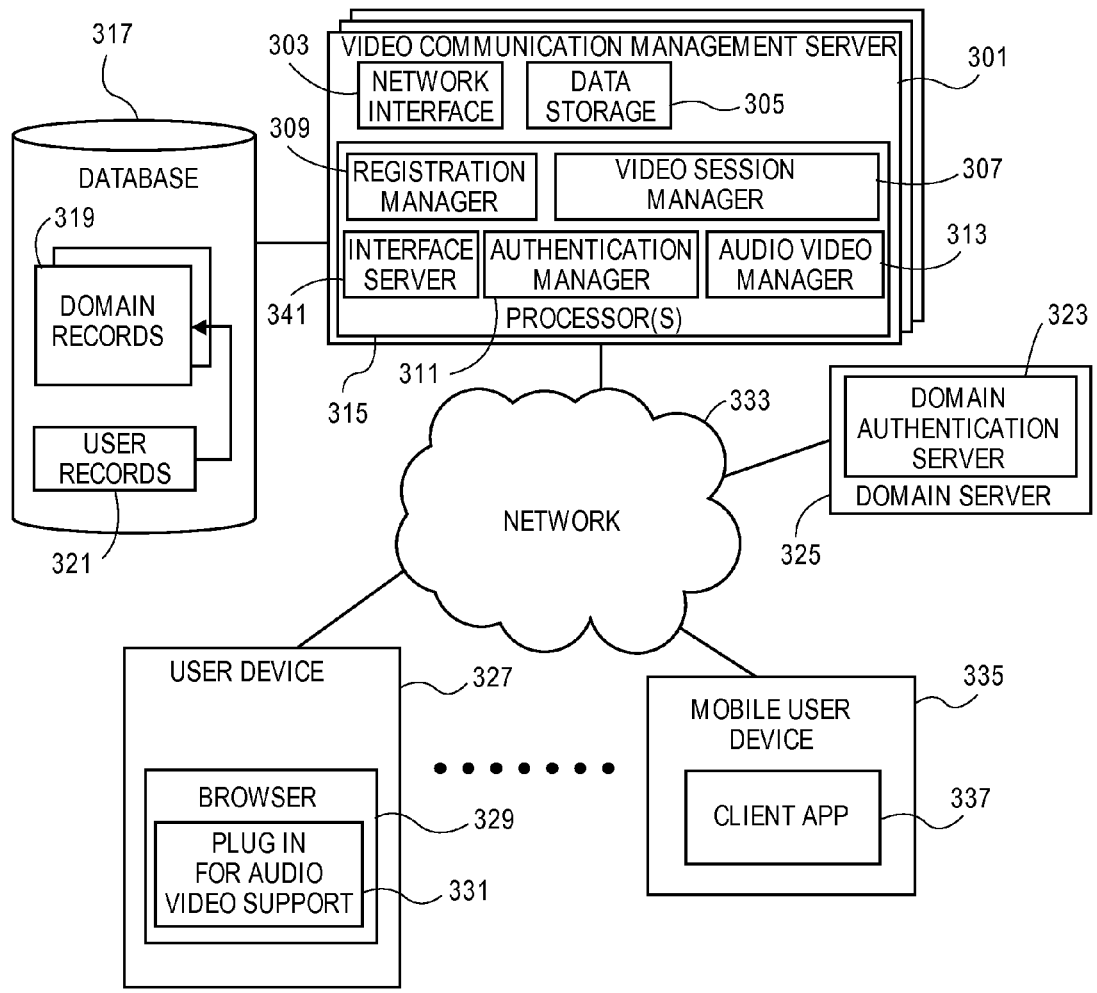
FIG. 3 is a diagram of one embodiment of a domain based video communication network including a video communication management server.

FIG. 3 is a diagram of one embodiment of a domain based video communication network including a video communication management server. In one embodiment, the video communication management server 301 includes a set of processors 315, a network interface 303, data storage 305 and similar components. A 'set,' as used herein refers to any positive whole number of items including one item. The video communication system can include any number of video communication management servers 301 that can handled the creation and join processes for the trusted-domain video communication networks supported by the video communication system. Any number and configuration of video communication management servers 301 can be present in the video communication system. In one embodiment, the set of video communication management servers 301 are a distributed implementation within a set of cloud or datacenter hosting centers. The set of video communication management servers 301 can be co-located or geographically distributed to enable high bandwidth or low latency connections with a set of user devices 327, 335 over a network 333. The video communication management servers 301 can be dedicated servers or similar computing or networking devices. In other embodiments, the video communication management servers 301 can be executed by a set of computing devices that support other services such as servers and computing devices configured in a cloud computing system or data center.

The network interface 303 of the video communication management server 301 can be a set of networking devices that enable communication over a wired or wireless link with other computing devices including user devices 327, 335, database 317, remote domain servers 325, databases 317 and other video communication management servers 301 or similar computing devices in the video communication system. The network interface 303 can support any number or combination of networking protocols that enable the communication of data including data involved in the creation or join processes for the video communication system.

Data storage 305 can be any type of memory or storage device in communication with the processors 315 of the video communication management server. The data storage 305 can be a set of dynamic random access memory (RAM) devices, solid state storage devices, fixed disk drives, magnetic drives, optical drives or similar data storage components in any combination. The data storage 305 can store data and instructions for implementing the functional components of the video communication management system 301 including the registration manager 309, interface server 341, video session manager 307, authentication manager 311, audio-video manager 313 and similar components of the video communication management server 301.

A set of processors 315 are communicatively coupled to the data storage 305, network interface 303 and similar components of the video communication management server 301. These components are provided by way of example, one skilled in the art would understand that other components and configurations of components consistent with the described structures and functions are within the scope of the invention. Other components are omitted by way of clarity to avoid obscuring the relevant elements of the invention. The features and functions are described in example configurations and modules, however, it should be understood that these features and functions can be configured in any combination or sub-division.

The set of processors 315 can include any number or variety of processing devices including general processing units, graphical processing units, application specific integrated circuits (ASICs) or similar processing devices. The set of processors 315 can execute a set of instructions that implement the registration manager 309, interface server 341, video session manager 307, authentication manager 311, audio-video manager 313 and similar functions of the video communication system. These elements are provided by way of example, one skilled in the art would understand that the functions and features of these elements can be combined or sub-divided in any configuration and distributed across any number of processors 315 and video communication management servers 301.

A registration manager 309 interacts with client application of a user device via the interface server 341 during a video communication session creation and joining processes to manage and update a set of domain records 319 and user records 321 stored in a database 317. The registration manager 309 creates domain records 319 upon encountering a domain for the first time and can record the domain name, authentication server address, domain specific policies and similar information. If changes in domain information are received during subsequent join or creation processes then the registration manager 309 can update the associated domain records 319. Similarly, the registration manager 309 can create and manager user records 321. User records 321 can include data specific to a user of the video communication system including a unique name, domain, authentication information (e.g., password or similar data) and similar user specific information. The user records 321 can include a reference or link to the associated domain records 319.

A video session manager 307 can handle the logic of creating and tearing down video communication sessions as well as managing participants for the video communication sessions. The video session manager 307 can interact with the interface server 341 to present user interfaces for the video session to users via client applications on the user devices. Audio-video processing can be handled in coordination with a specialized audio-video manager 313 that can implement audio-video communication protocols, codecs and technologies as needed to implement a video communication session.

The video session manager 307 can interact with an authentication manager 311 to utilize a user provided authentication principle to authenticate the user to an associated domain. The authentication manager 311 can query the domain server 325 to supply the authentication principle or similar data to the domain authentication server 323 of the domain server 325. The authentication manager 311 receives back a confirmation of the authenticity of the user as a member of the domain or denial of the user being a member of the domain. The authentication manager 311 then notifies the video session manager 307 to enable or block the user from joining a video communication session associated with the domain per the policies of the video communication network for that domain. The video session manager 307 can implement separate policies for members of a domain and non-members of the domain. The video session manager 307 can provide user interfaces for negotiating participation in video communication sessions such as waiting rooms and similar interfaces to effect the varying policies.

The video communication management server 301 can be in communication with a set of user devices 327, 335 over a network 333. The network 333 can be any type of network or a set of separate or interworking networks. The network 333 can include a wide area network (WAN), such as the Internet, a metropolitan area network, a local area network (LAN) or similar communication networks. The video communication management servers 301 can also be connected to one another over the network 333 or a portion of the network 333 as well as to domain servers 325 and databases 317. Any number and combination of networking technologies, protocols and devices can be utilized in the network, which may include any number of networking elements such as routers, bridges, switches and similar devices that enable communication with any number of end user devices 327, 335 or similar computing devices.

Any number and type of user devices 327, 335 can be in communication with and interact with the services of the video communication management server 301. The user devices 327 can be personal computers such as laptop and desktop computer systems, workstations, console devices or similar computing devices. The user devices 335 can also include mobile computing devices such as smartphones, tablets, wearable devices and similar mobile computing devices 335. The user devices 327, 335 can execute a client application that communicates with the video communication management server 301 to enable creation of and/or participation in a video communication session specified by the user in the client application of the user device 327, 335.

In one embodiment, the client application can be a general purpose application such as a web browser that has functionality capable of supporting a video communication session and display of user interfaces received from the interface server 341 of the video communication management server 301. In some embodiments, the functionality of the general purpose client application such as a browser 329 is augmented by a specialized support application, plug-in 331 or similar component. The specialized support application can provide any additional or missing functionality for participation in or creation of video communication sessions. In other embodiments, the client application can be a specialized application 337 for creation of and participation in video communication sessions. The specialized application can be a standard application, mobile application, an application that executes within an environment provided by another application, such as HTML 5 or Flash (by Adobe Systems of San Jose, Calif.), or similar application design to specifically support video communication sessions or more specifically video communication sessions of the video communication management server.

Figure 4:
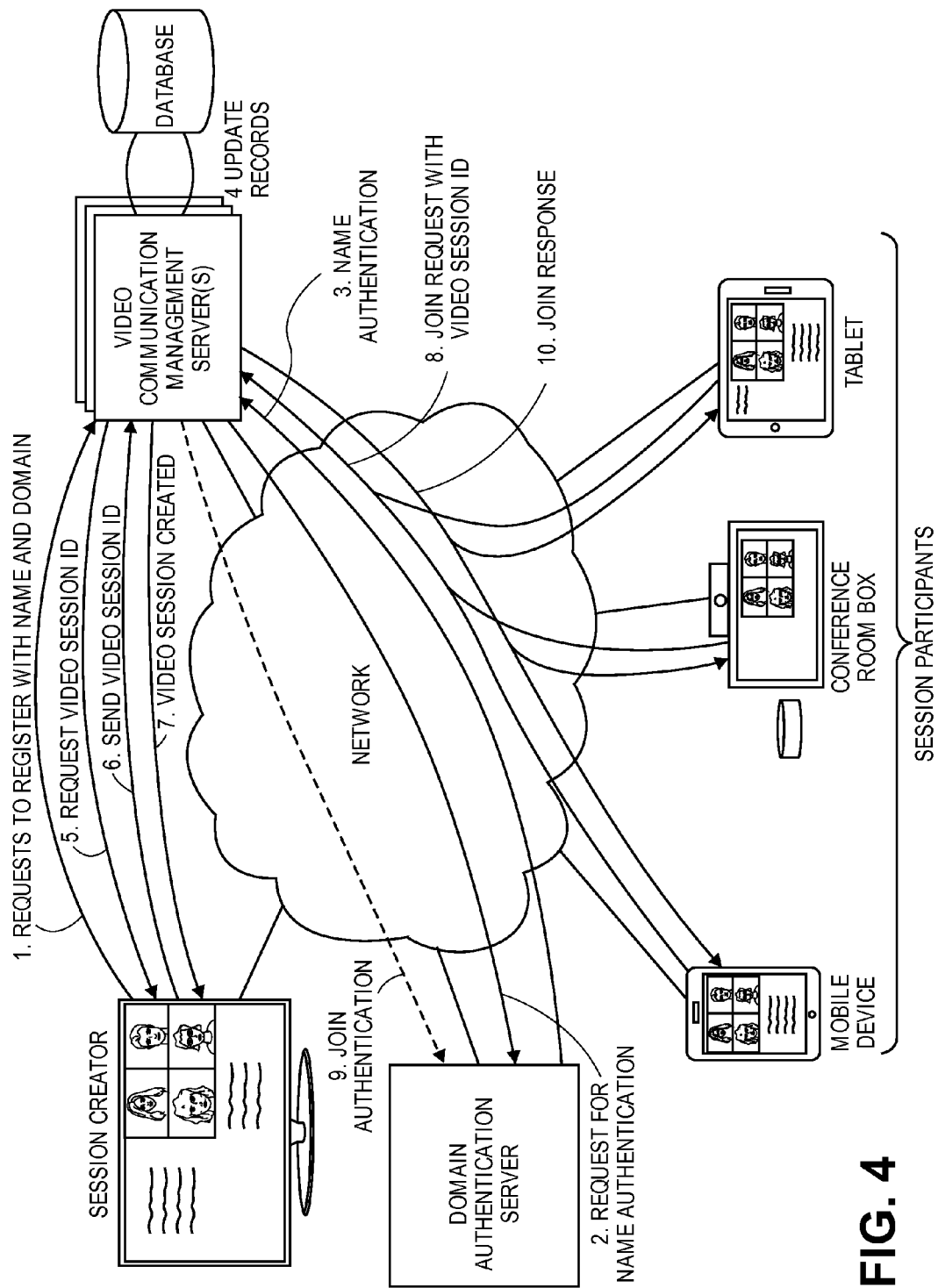
FIG. 4 is a diagram of one example embodiment of a video communication session creation and a join operation by participants in a domain based video communication network including a video communication management server.

FIG. 4 is a diagram of one example embodiment of a video communication session creation and join in a domain based video communication network including a video communication management server. The diagramed example scenario is provided by way of illustration and not limitation. In this example, a first user of a computing device, the 'session creator,' starts the process by using a client application to request to register with the system by inputting a unique user name and a domain of the user. The scenario assumes that this is the first time that the user has utilized the video communication system. Where a user has already registered or otherwise authenticated with the video communication system this step is not carried out. The unique name must be unique within the domain specified, in some embodiments the domain and unique name can be supplied by entering in an email address of the user. For example, an email address like 'johnsmith@example.com' includes a unique name for the domain, 'johnsmith,' and the domain name, 'example.com.' In some embodiments, this step can be combined with other steps where additional information is provided such as authentication information including passwords, video communication session names or similar information. The client application can communicate with the video communication management server via any communication protocol. Where the client application is a specialized application it can be coded or configured with the locator information (e.g., URL or IP address) needed to reach the video communication server. Where the client is a general purpose application the video communication management server can be accessed by input of a known locator (such as a URL) for the video communication management server. The video communication management server can be configured to service URLs that include the domain name in any part of the URL, e.g., a URL such as 'domainname.videoservices.com' or 'videoservices.domainname.com' or similar locator. In these embodiments, the user does not need to separately specify the associated domain as it is inherent in the access of the service. Similarly, a specialized application can be configured with an associated domain such that separate provision of the domain is not required.

The registration request can also be a video session creation request; the scenario assumes that the registration request is part of a video session creation request. The video communication management server, upon receiving the request from a new user, queries the domain authentication server or a domain server that offers an authentication service. The query is a request for authentication of the user of the given domain. The authentication request can include the unique name of the user for the domain along with additional information such as a secret (e.g., a password) for the domain that can be utilized to authenticate the user with the domain. In other embodiments, the domain authentication server can initiate an independent authentication process with the user via email or other interface. After the domain authentication server completes the authentication process it responds with a name authentication message indicating whether the authentication was successful or not successful. In this example, the authentication is successful.

The video communication management server creates domain and user records including data such as domain authentication server information, user unique name, reference links to between the records and similar information. The video communication management server can then indicate a successful authentication by querying the user for a video communication session name or a complete video communication session identifier. In some embodiments, the video communication session identifier is a combination of the domain information and the user selected name. For example a user can specify a name 'firstsession' and this can be combined with the example location information 'domainname.videoservices.com' to form a video session identifier 'domainname.videoservices.com/firstsession.' Any format or combination of the video communication session name and domain information can be utilized. Once the video communication session identifier has been created, then the video communication management server can create the video communication session.

The video communication session data traffic does not necessarily pass through the video communication management server. Instead it can be multicast to each of the participants and the role of the video communication management server is to help establish the virtual domain-trusted video communication network that establishes the multicasting of the video communication session. The video communication management server can utilize any video telecommunications protocols to implement the video sharing between the participants as well as other ancillary functionality such as document sharing, video or audio capture or similar functions. The video communication management server can also help facilitate the distribution of the video communication session identifier to parties specified by the session creator or other participants. In other embodiments, the users communicate the video communication session identifier by other communication technologies or direct communication.

When another user seeks to join the now active video communication session they can utilize the client application on their computing device, such as the smartphone, dedicated conference room device, a tablet or similar computing device as illustrated. Each participant can independently send a join request via the client application to the video communication management server, where the request specifies the video communication session identifier. These users may need to authenticate themselves as members of the domain or they will be treated as non-members of the domain. The video communication management server can facilitate the authentication with the domain authentication server during the join process as needed.

Upon receiving the join request and the resolution of any authentication process, the video communication management server responds by providing a join response to each of the participants via their respective client applications. The join response can be to immediately join the client application with the video communication session where authentication confirms the user as a member of the domain. Where the user is not confirmed as a user of the domain, a separate set of policies may be specified such that the user may be required to await approval of the session creator or other participants before being joined and may be placed in a waiting room interface via the client application.

Thus, a method, system and apparatus for domain-trusted video communication system been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of managing a dynamic video communications system with real time provisioning of a video communication session in a domain video network between a set of user devices, the method comprising:
   receiving an identifier of a video communication session from a user device, where the identifier includes a domain and a name;
   determining an authentication principle associated with the user device, where the authentication principle includes a domain of the user;
   checking whether the domain of the user matches a domain of the video communication session;
   joining the user device with the video communication session; and
   sending a waiting room interface to the user device in response to the domain of the user not matching the domain of the video session.

2. The method of managing the dynamic video communication system of claim 1, further comprising:
   applying a first set of policies for a user from the domain of the video communication session; and
   applying a second set of policies for a user from a different domain from the video communication session.

3. The method of managing the dynamic video communication system of claim 1, further comprising:
   notifying the video session participants of the authentication principle.

4. The method of managing the dynamic video communication system of claim 1, further comprising:
   receiving an admission notification from a video session participant.

5. The method of managing the dynamic video communication system of claim 4, wherein the joining of the user device with the video communication session is in response to the admission notification.

6. A method of managing a dynamic video communications system with real time provisioning of a video communication session in a domain video network between a set of user devices, the method comprising:

receiving an identifier of a video communication session from a user device, where the identifier includes a domain and a name;

determining an authentication principle associated with the user device, where the authentication principle includes a domain of the user;

checking whether the domain of the user matches a domain of the video communication session;

joining the user device with the video communication session;

receiving a request from a second user device to create the video communication session;

receiving a second authentication principle from a user requesting to create the video communication session;

authenticating the second authentication principle by querying a domain in the second authentication principle; and creating the video communication session using the domain in the second authentication principle.

7. The method of managing the dynamic video communication system of claim 6, further comprising:

requesting a video communication session name from the user device;

receiving the video communication session name from the user device; and using the domain and the video communication session name as an identifier for the video communication session.

8. The method of managing dynamic video communication system of claim 7, further comprises:

updating a domain record to include the domain from the second authentication principle; and updating a user record to include a unique name from the second authentication principle and a reference to the domain record.

9. A non-transitory computer-readable medium having stored therein a set of instructions to be executed by a computer system, which when executed cause the computer system to perform a set of operations for managing a dynamic video communications system with real time provisioning of a video communication session in a domain video network between a set of user devices, the set of operations comprising:

receiving an identifier of a video communication session from a user device, where the identifier includes a domain and a name;

determining an authentication principle associated with the user device, where the authentication principle includes a domain of the user;

checking whether the domain of the user matches a domain of the video communication session;

joining the user device with the video communication session; and sending a waiting room interface to the user device in response to the domain of the user not matching the domain of the video session.

10. The non-transitory computer-readable medium of claim 9, having stored therein further instructions, which when executed cause the computer system to perform a set of further operations comprising:

applying a first set of policies for a user from the domain of the video communication session; and applying a second set of policies for a user from a different domain from the video communication session.

11. The non-transitory computer-readable medium of claim 9, having stored therein further instructions, which when executed cause the computer system to perform a set of further operations comprising:

notifying the video session participants of the authentication principle.

12. The non-transitory computer-readable medium of claim 9, having stored therein further instructions, which when executed cause the computer system to perform a set of further operations comprising:

receiving an admission notification from a video session participant.

13. The non-transitory computer-readable medium of claim 12, wherein the joining of the user device with the video communication session is in response to the admission notification.

14. A non-transitory computer-readable medium having stored therein a set of instructions to be executed by a computer system, which when executed cause the computer system to perform a set of operations for managing a dynamic video communications system with real time provisioning of a video communication session in a domain video network between a set of user devices, the set of operations comprising:

receiving an identifier of a video communication session from a user device, where the identifier includes a domain and a name;

determining an authentication principle associated with the user device, where the authentication principle includes a domain of the user;

checking whether the domain of the user matches a domain of the video communication session;

joining the user device with the video communication session;

receiving a request from a second user device to create the video communication session;

receiving a second authentication principle from a user requesting to create the video communication session;

authenticating the second authentication principle by querying a domain in the second authentication principle; and creating the video communication session using the domain in the second authentication principle.

15. The non-transitory computer-readable medium of claim 14, having stored therein further instructions, which when executed cause the computer system to perform a set of further operations comprising:

requesting a video communication session name from the user device;

receiving the video communication session name from the user device; and using the domain and the video communication session name as an identifier for the video communication session.

16. The non-transitory computer-readable medium of claim 15, having stored therein further instructions, which when executed cause the computer system to perform a set of further operations comprising:

updating a domain record to include the domain from the second authentication principle; and updating a user record to include a unique name from the second authentication principle and a reference to the domain record.

17. A video communication management server to manage real time provisioning of a video communication session in a domain video network between a set of user devices, the video communication management server comprising:

a network interface to enable communication with the set of user devices over a network; and a processor coupled to the network interface, the processor configured to execute a video session manager to receive an identifier of a video communication session from a user device, where the identifier includes a domain and a name, to join the user device with the video communication session, and to send a waiting room interface to the user device in response to a domain of the user not matching a domain of the video session;

and an authentication manager to determine an authentication principle associated with the user device, where the authentication principle includes the domain of the user, and to check whether the domain of the user matches the domain of the video communication session.

18. The video communication management server of claim 17, wherein the video session manager is further configured to receive a request from a second user device to create the video communication session, to receive a second authentication principle from a user requesting to create the video communication session, authenticate the second authentication principle by querying a domain in the second authentication principle, and create the video communication session using the domain in the second authentication principle.

* * * * *